(12) United States Patent
Grant et al.

(10) Patent No.: US 11,374,987 B2
(45) Date of Patent: Jun. 28, 2022

(54) DYNAMIC CHANNEL CONVERSION IN GROUP-BASED COMMUNICATION SYSTEMS

(71) Applicant: Slack Technologies, Inc., San Francisco, CA (US)

(72) Inventors: Myles Grant, San Carlos, CA (US); Elizabeth Clemenson, San Francisco, CA (US); Paul Rosania, San Francisco, CA (US); Sri Vasamsetti, San Francisco, CA (US); Yingyu Sun, San Francisco, CA (US); Andrew King, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/157,085

(22) Filed: Jan. 25, 2021

(65) Prior Publication Data
US 2021/0243234 A1 Aug. 5, 2021

Related U.S. Application Data

(60) Provisional application No. 62/968,284, filed on Jan. 31, 2020.

(51) Int. Cl.
*H04L 29/06* (2006.01)
*H04L 65/1093* (2022.01)
(Continued)

(52) U.S. Cl.
CPC ........ *H04L 65/1093* (2013.01); *H04L 63/102* (2013.01); *H04L 63/108* (2013.01);
(Continued)

(58) Field of Classification Search
CPC ... H04L 67/1097; H04L 67/306; H04L 51/12; H04L 51/04; H04L 51/10; H04L 51/18;
(Continued)

(56) References Cited

U.S. PATENT DOCUMENTS 10,032,046 B1 * 7/2018 Hayashi .............. H04L 63/0245
2010/0195812 A1 * 8/2010 Florencio .............. H04M 3/565
379/202.01

(Continued)

OTHER PUBLICATIONS

PCT Search Report and Written Opinion dated Apr. 6, 2021 for PCT Application No. PCT/US21/14930, 15 pages.
(Continued)

*Primary Examiner* — Jungwon Chang
(74) *Attorney, Agent, or Firm* — Lee & Hayes, P.C.

(57) ABSTRACT

Techniques for dynamically converting a communication channel associated with a communication channel from a communication channel associated with a single organization to a shared communication channel associated with two or more organizations. The communication channel may have associated therewith member profiles associated with a first organization and one or more guest profiles associated with one or more other organizations that are different from the first organization. A server computing system may convert the communication channel to a shared communication channel based on a determination of eligibility for conversion. The server computing system may generate one or more user interfaces associated with the member profiles and the one or more guest profiles, enabling members and guests to communicate via the shared communication channel.

20 Claims, 12 Drawing Sheets

(51) Int. Cl.
*H04L 67/306* (2022.01)
*H04L 9/40* (2022.01)
*H04L 65/403* (2022.01)
*H04L 67/55* (2022.01)

(52) U.S. Cl.
CPC ............ *H04L 65/403* (2013.01); *H04L 67/26* (2013.01); *H04L 67/306* (2013.01)

(58) Field of Classification Search
CPC ... H04L 65/1093; H04L 65/403; H04L 67/10; H04L 63/102; H04L 63/108; H04L 67/26
See application file for complete search history.

(56) References Cited

U.S. PATENT DOCUMENTS

| | | | |
|---|---|---|---|
| 2018/0248709 A1* | 8/2018 | Leydon | H04L 51/12 |
| 2018/0287982 A1 | 10/2018 | Draeger et al. | |
| 2019/0026298 A1* | 1/2019 | Jin | H04L 67/1097 |
| 2019/0098087 A1 | 3/2019 | Johnston et al. | |
| 2019/0205810 A1* | 7/2019 | Pojar | H04L 67/306 |
| 2019/0319900 A1* | 10/2019 | Marlow | H04L 51/04 |
| 2021/0056153 A1* | 2/2021 | Giordani | G06F 16/9535 |

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

INVITE MULTI-CHANNEL GUESTS

New multi-channel will only have access to these chanels channel 1 ✕   #channel 2 ✕   #channel 3 ✕

Email Addresses

Shannon@tinydiet.com 🔍

First Name
(optional) 🔍

Last Name
(optional) 🔍

Invite to

+ Add another

Big teams to invite? <u>Invite many people at once</u>

Make your invite a little bit more personal by writing <u>a custom message</u>

Invite 1 Multi-Channel Guest

You'll be charged a pro-rated amount for each new member. See our Guide to billing. Note that guest accounts can access your Team Directory. See all pending and accepted invitations.

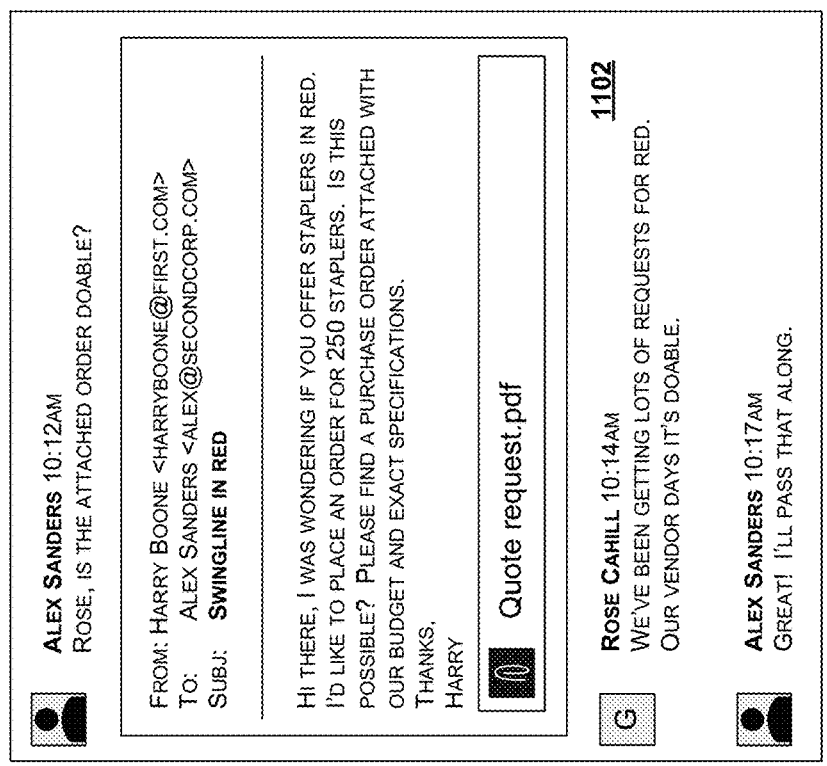
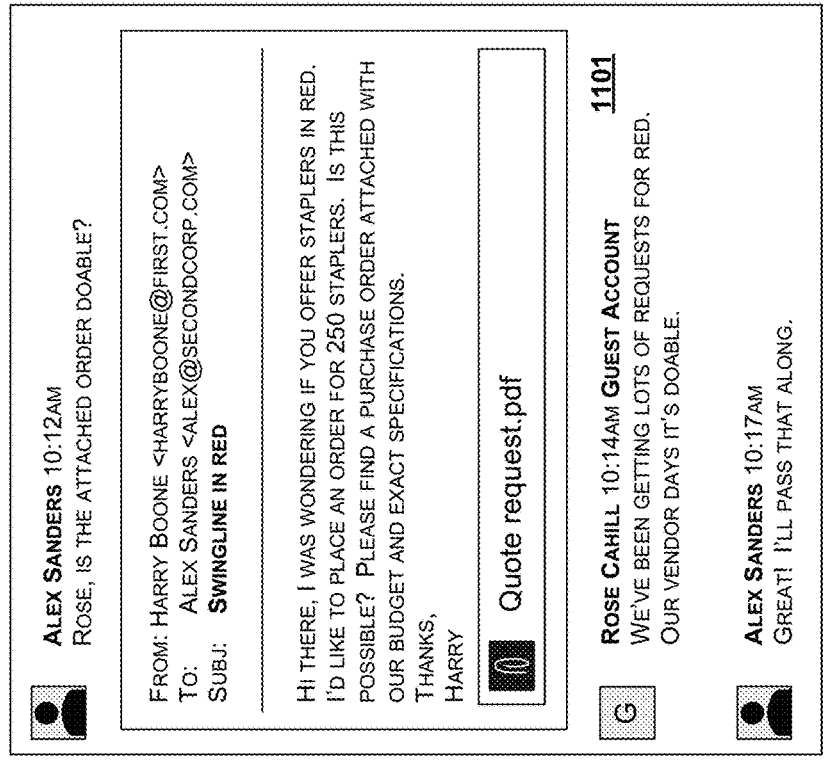
FIG. 11

DYNAMIC CHANNEL CONVERSION IN GROUP-BASED COMMUNICATION SYSTEMS

PRIORITY

This application is a continuation of and claims priority to U.S. Provisional Patent Application No. 62/968,284, filed Jan. 31, 2020, and entitled "Dynamic Channel Conversion in Group-Based Communication Systems," the entire contents of which are incorporated herein by reference.

BACKGROUND

Effective and efficient data storage across various storage servers is central to operational effectiveness of various distributed software applications. Existing distributed software applications have a number of deficiencies and problems associated with data storage. Through applied effort, ingenuity, and innovation, many of these identified problems have been solved by developing solutions that are included in examples of the present disclosure, many examples of which are described in detail herein.

BRIEF DESCRIPTION OF THE DRAWINGS

The detailed description is described with reference to the accompanying figures, which are not necessarily drawn to scale. In the figures, the left-most digit(s) of a reference number identifies the figure in which the reference number first appears. The use of the same reference numbers in different figures indicates similar or identical components or features.

FIGS. 5A and 5B are operational examples of guest invitation user interfaces according to some examples of the present disclosure.

FIG. 11 is an operational example of a user content conversion process according to some examples of the present disclosure.

DETAILED DESCRIPTION

Figure 1:
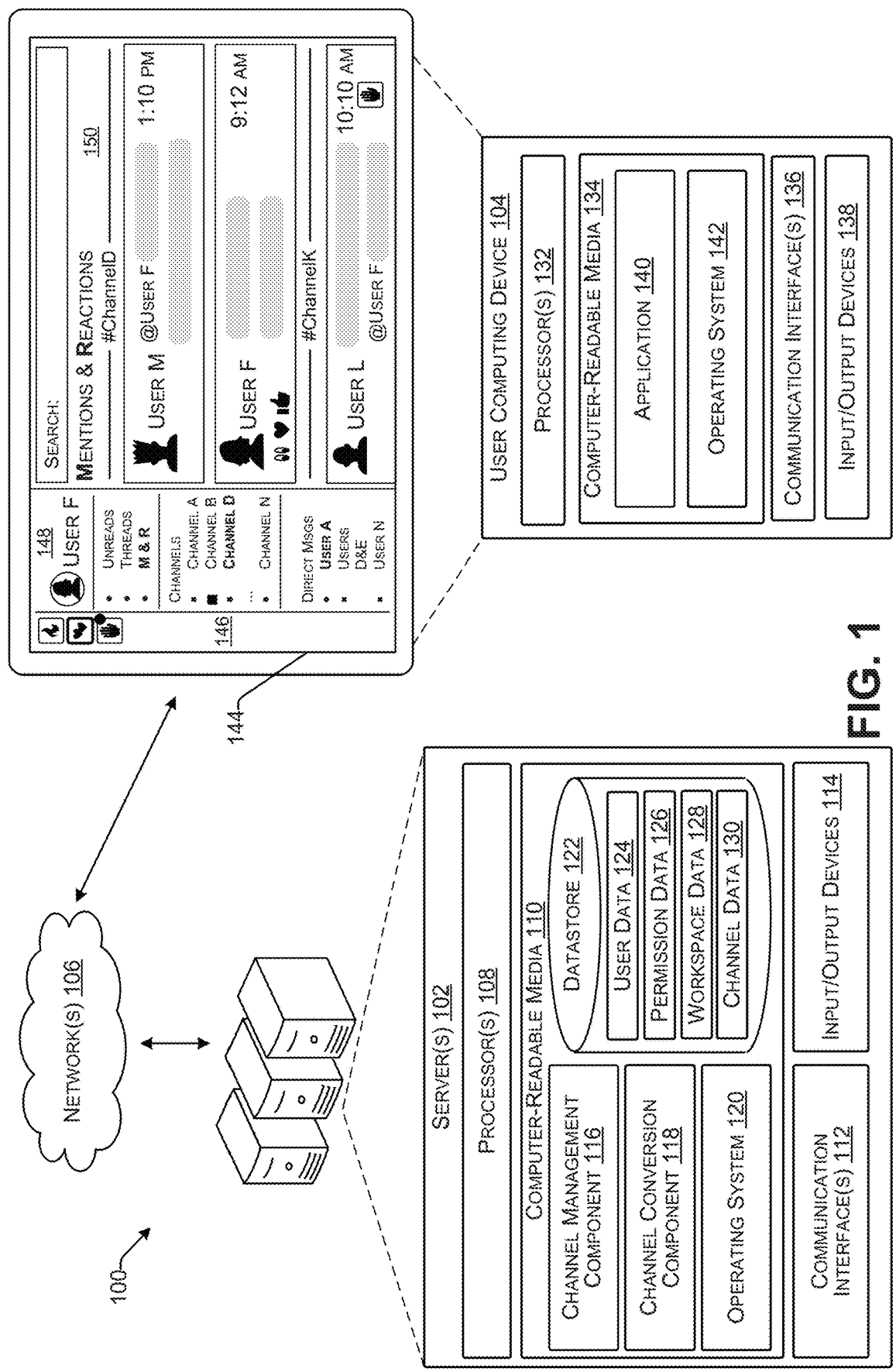
FIG. 1 depicts an example environment for performing techniques of the present disclosure.

Dynamic channel conversion in communication systems is described. A communication system can be a group-based communication system, a channel-based messaging platform, and/or any other system for facilitating communication between and among users. In an example, a user of an organization can utilize communication services available via the communication system to communicate with one or more users of the organization and/or one or more guests of the organization via a communication channel (e.g., group-based communication channel). A guest may include a user that is not associated with the organization, but is granted limited privileges to communicate with members of the first organization via the communication channel. The communication channel may include a non-shared communication channel that is associated with a particular organization. The non-shared communication channel may include a means by which members of the particular organization and, in some examples, one or more guests of the organization, can communicate via the communication system.

The dynamic channel conversion techniques described herein may include one or more computer-implemented processes configured to automatically convert and/or automatically recommend conversion of a non-shared communication channel to a shared communication channel. A shared communication channel may include one or more users that are associated with a first organization (e.g., the particular organization described above) and one or more users that are associated with a second organization (e.g., an organization that is different from the particular organization). The communication system may automatically convert the communication channel to a shared communication channel and/or automatically provide a recommendation to convert the communication channel to a shared communication channel based on user activity data associated with the communication channel.

While various examples of the present disclosure describe performing dynamic channel conversion in a group-based communication system, a person of ordinary skill in the relevant technology will recognize that various techniques described herein may be used to perform dynamic channel conversion in any distributed communication software application.

Examples of the present disclosure introduce solutions for generating shared group-based communication channels in a dynamic manner based on user activity data associated with guest profiles associated with group-based communication channels. A shared group-based communication channel may include a group-based communication channel that is configured to enable users of two or more different organizations to communicate. For example, a user associated with organization A may invite a second user associated with organization B to join a communication channel that is shared between at least organization A and organization B and the respective group (e.g., organization) identifiers associated therewith.

The noted solutions enable determining when level of guest user activity within a particular communication channel warrants conversion of the communication channel into a shared channel as well as reconciliation of guest profiles across two separate communication systems stored on distinct storage platforms. In doing so, various examples of the present invention disclose fine-tuning sharing parameters of group-based communication channels in order to optimize storage costs of storing data associated with such group-based communication channels across multiple storage servers. This in turn increases storage-wise efficiency of distributed communication software applications by enabling conditional replication of user data across diverse storage servers in the particular instances where keeping user data associated with guest profiles on primary storage platforms will likely lead to duplicate storage of data serving similar functionality as well as the need to incur substantial data retrieval costs associated with retrieval of guest data from remote storage servers. The primary storage platform may include a data object that describes one or more storage devices associated with a primary organizational identifier (e.g., organization associated with a group-based communication channel before and after a conversion to a shared group-based communication channel).

Thus, by introducing solutions for generating shared group-based communication channels in a dynamic manner based on user activity data corresponding to guest profiles associated with group-based communication channels, various examples of the present disclosure make important technical contributions to storage efficiency of distributed communication software applications. Moreover, the noted solutions reduce data retrieval costs associated with the need for retrieval of guest content data from remote storage severs. Accordingly, various examples of the present disclosure substantially improve storage efficiency and data retrieval efficiency of existing distributed communication software applications.

Various examples of the present disclosure will now be described more fully hereinafter with reference to the accompanying drawings, in which some, but not all examples of the disclosure are shown. Indeed, the disclosure may be embodied in many different forms and should not be construed as limited to the examples set forth herein; rather, these examples are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Example System Architecture

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a channel management component 116, a channel conversion component 118, an operating system 120, and a datastore 122.

In at least one example, the channel management component 116 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 116 can establish a communication channel between and among various user computing devices, allowing the user computing devices to communicate and share data between and among each other.

In at least one example, the channel management component 116 can manage such communications and/or sharing of data The channel management component 116 can transfer messages (e.g., message communications including text, image, video, audio or a combination thereof provided by a user computing device 104, metadata associated with messages including message identifier, message contents, sending user identifier, a group identifier, a communication channel identifier, time stamp, etc.) between users having associated credentials and/or permissions to view the communication channel. In various examples, a communication channel identifier, or a unique identifier associated with a particular communication channel) can be associated with user profiles of the users authorized to interact with content therein. In such examples, the channel management component 116 can identify the users that have the credentials and/or permissions to interact with the content of a communication channel based on data stored in the user profiles.

The channel management component 116 can identify users having the associated credentials and can cause a display of messages associated with each communication channel to authorized users. Data associated with a communication channel can be presented via a user interface. In some examples, data associated with different users can be presented differently on associated user interfaces. For example, a first user interface associated with a guest profile may be presented differently than a second user interface associated with a member profile. In at least one example, the channel management component 116 can interact with the channel conversion component 118 to manage the generation, presentation, and/or access to user interfaces including functionalities associated with communication channels based on whether a user is associated with a guest profile or a member profile.

In some examples, the channels managed by the channel management component 116 may be associated with a particular organization. In such examples, the communication channels can be associated with an organizational identifier (e.g., group identifier) and can be available to members of the particular organization and/or guests thereof. The organizational or group identifier may include a unique identifier by which a particular organization or group of users may be identified. Communication channels that are accessible to members of an organization and/or guests of the organization and/or communication channel are referred to herein as non-shared channels.

In some examples, the channels managed by the channel management component 116 may be associated with two or more organizations and/or two or more organizational identifiers. Communication channels that are associated with two or more organizations are referred to herein as shared communication channels. In various examples, the channel conversion component 118 can be configured to modify a non-shared communication channel into a shared communication channel responsive to receiving a request, such as from an administrator of an organization associated with the non-shared communication channel. In some examples, the shared communication channel may be generated based on receiving an approval thereof from administrators of the prospective associated organizations.

In various examples, the channel conversion component 118 can be configured to automatically modify the non-shared communication channel into the shared communication channel. In such examples, the channel conversion component 118 can automatically convert the communication channel based on user activity associated with the non-shared communication channel. In some examples, the channel conversion component 118 can automatically convert the communication channel based on a determination that a condition associated with the communication channel is satisfied. The condition can include a conversion eligibility condition, as discussed in detail with respect to FIG. 4.

In various examples, the channel conversion component 118 can be configured to modify channel metadata associated with the non-shared communication channel to indicate the conversion to a shared communication channel. In at least one example, an organizational identifier associated with the non-shared communication channel can be referred to as a primary organizational identifier and one or more other organizational identifiers associated with the shared communication channel (e.g., added after conversion) can be referred to as secondary organizational identifier, tertiary organizational identifiers, and the like.

In various examples, the channel conversion component 118 may be configured to perform one or more profile reconciliation actions for formerly designated guest user profiles (e.g., guest profiles) associated with the non-shared communication channels. The profile reconciliation action (s) may include transferring data from a guest profile with limited access privileges with respect to the non-shared communication channel to a member profile (e.g., a destination profile) with full access privileges with respect to the (converted) shared communication channel. In some examples, the profile reconciliation action(s) may include generating a destination profile corresponding to the guest profile (e.g., associated with the same user). In some examples, the profile reconciliation action(s) may include identifying an existing destination profile that corresponds to a same user as the guest profile of the non-shared communication channel. In such examples, the channel conversion component 118 identifies an identity association between the guest profile and the destination profile (e.g., member profile with member access privileges). The identity association can indicate that the guest profile and the destination profile are associated with a same user. In some examples, the destination profile can include an association with a second organization. In such examples, after converting the non-shared communication channel to a shared communication channel, a second organizational identifier can be associated with the shared communication channel (e.g., secondary organizational identifier).

In response to generating and/or identifying the destination profile, the channel conversion component 118 can transfer data associated with the guest profile to the destination profile. The data can include messages, metadata associated with the messages, files associated with messages, profile information (e.g., username, nickname, contact information, etc.), and the like. In various examples, responsive to transferring the data corresponding to the guest profile to the destination profile, the channel conversion component 118 can delete the guest profile associated with the non-shared communication channel, thereby increasing a storage capacity associated with the communication platform.

In various examples, the channel conversion component 118 can be configured to automatically recommend a conversion of a non-shared communication channel into a shared communication channel. In such examples, the channel conversion component 118 can automatically provide a recommendation, such as to an administrator of an organizational account, to convert the non-shared communication channel into a shared communication channel. In some examples, the channel conversion component 118 can provide the recommendation to convert the communication channel based on a determination that a condition (e.g., conversion eligibility condition) associated with the communication channel is satisfied. The channel conversion component 118 may provide the recommendation as a notification (e.g., pop-up notification, etc.), a message delivered via the communication platform, or the like.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In some examples, the user data 124 may include one or more guest profiles generated responsive to a request submitted by an administrator of an organization.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permissions data 126 may include whether a particular user profile is associated with full access privilege (e.g., member access privilege) or limited access privilege (e.g., guest access privilege). As used herein, limited access privilege may include limited access to functionalities associated with the communication platform. For example, a user profile having limited access privilege may be denied the privilege to request to join other communication channels and/or workspaces, to invite other members to join communication channels and/or workspaces, and the like. In various examples, a user profile having limited access privileges may submit an access privilege request to obtain full access privilege with respect to one or more communication channels and/or workspaces. An access privilege request can be submitted by an individual user associated with a guest (or limited access) profile or by an administrator of an associated communication channel and/or workspace.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 116 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

Channel data 130 associated with a primary organizational identifier can be stored on a primary storage platform configured to store communication data (e.g., messages, files, etc.) associated with one or more communication channels and/or workspaces corresponding to the primary organizational identifier. Channel data 130 associate with a secondary organizational identifier can be stored on a secondary storage platform configured to store communication data associate with one or more communication channels and/or workspaces corresponding to the secondary organizational identifier. The primary and/or secondary storage platforms can include one or more storage units, such as multiple distributed storage units that are connected through a computer network. Each storage unit in the primary storage platform may store at least one of one or more data assets and/or one or more data about the computed properties of one or more data assets. Moreover, each storage unit in the primary storage platform may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace(s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the channel management component 116, the channel conversion component 118, and the application 140, techniques described herein can be performed by any other component, or combination of components, which can be associated with the server(s) 102, the user computing device 104, or a combination thereof.

Figure 2:
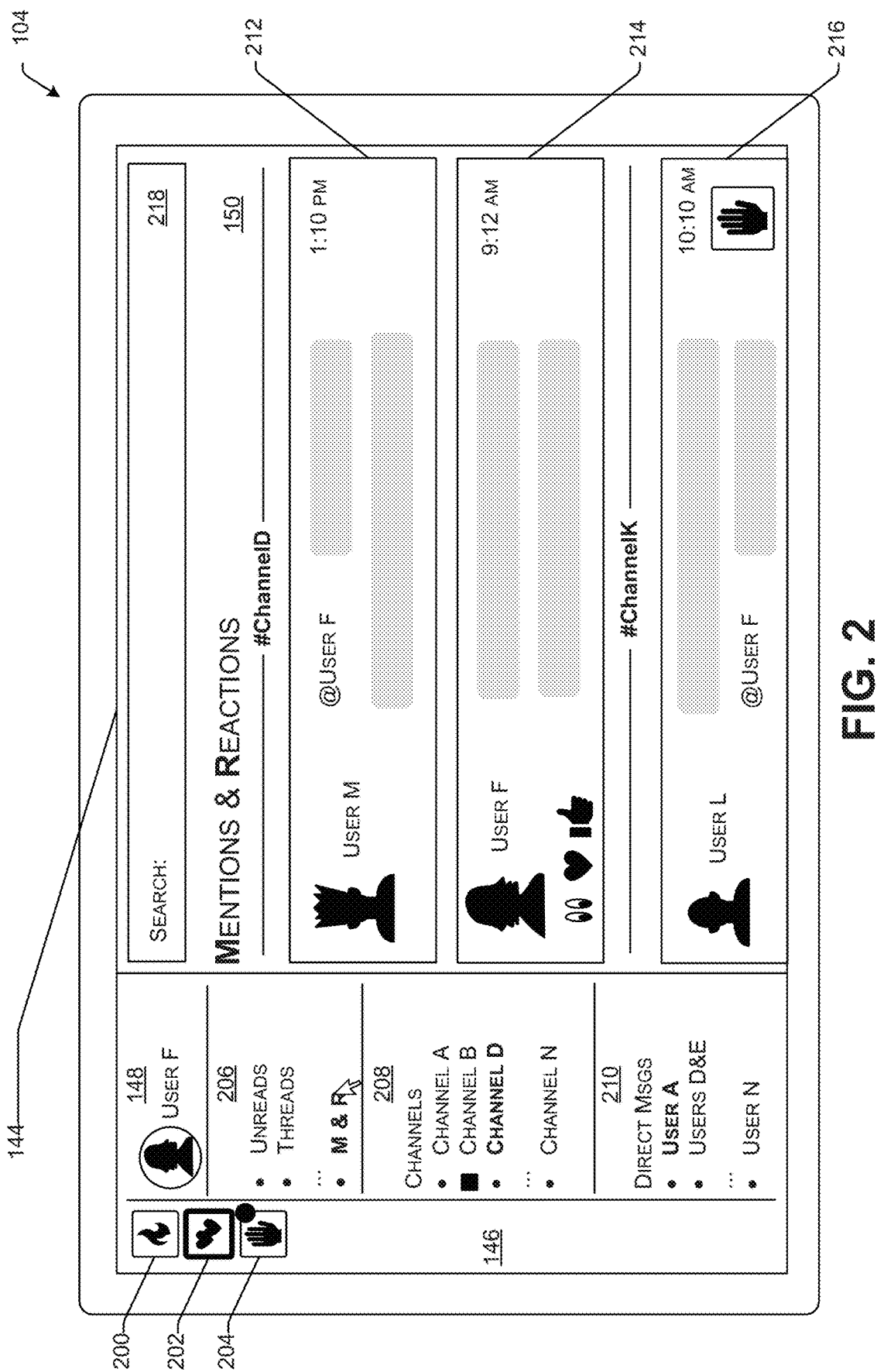
FIG. 2 illustrates additional details associated with a user interface of a communication platform that presents data associated with multiple communication channels, as described above with reference to FIG. 1.

FIG. 2 illustrates additional details associated with the user interface 144 that presents data associated with a user profile that includes full access privileges, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier, non-shared communication workspace). In some examples, one or more of the workspaces can be associated with different organizations (e.g., associated with different organization identifiers, shared communication workspaces). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user (e.g., User F), can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the channel management component 116 and/or channel conversion component 118 and the application 140 can generate and present the user interface 144 based on the data. In other examples, the application 140 can receive data from the channel management component 116 and instructions for generating the user interface 144 from the channel conversion component 118. In such an example, the application 140 can present the user interface 144 based on the instructions. Additional or alternative data can be presented via a user interface and additional or alternative configurations can be imagined.

Figure 3:
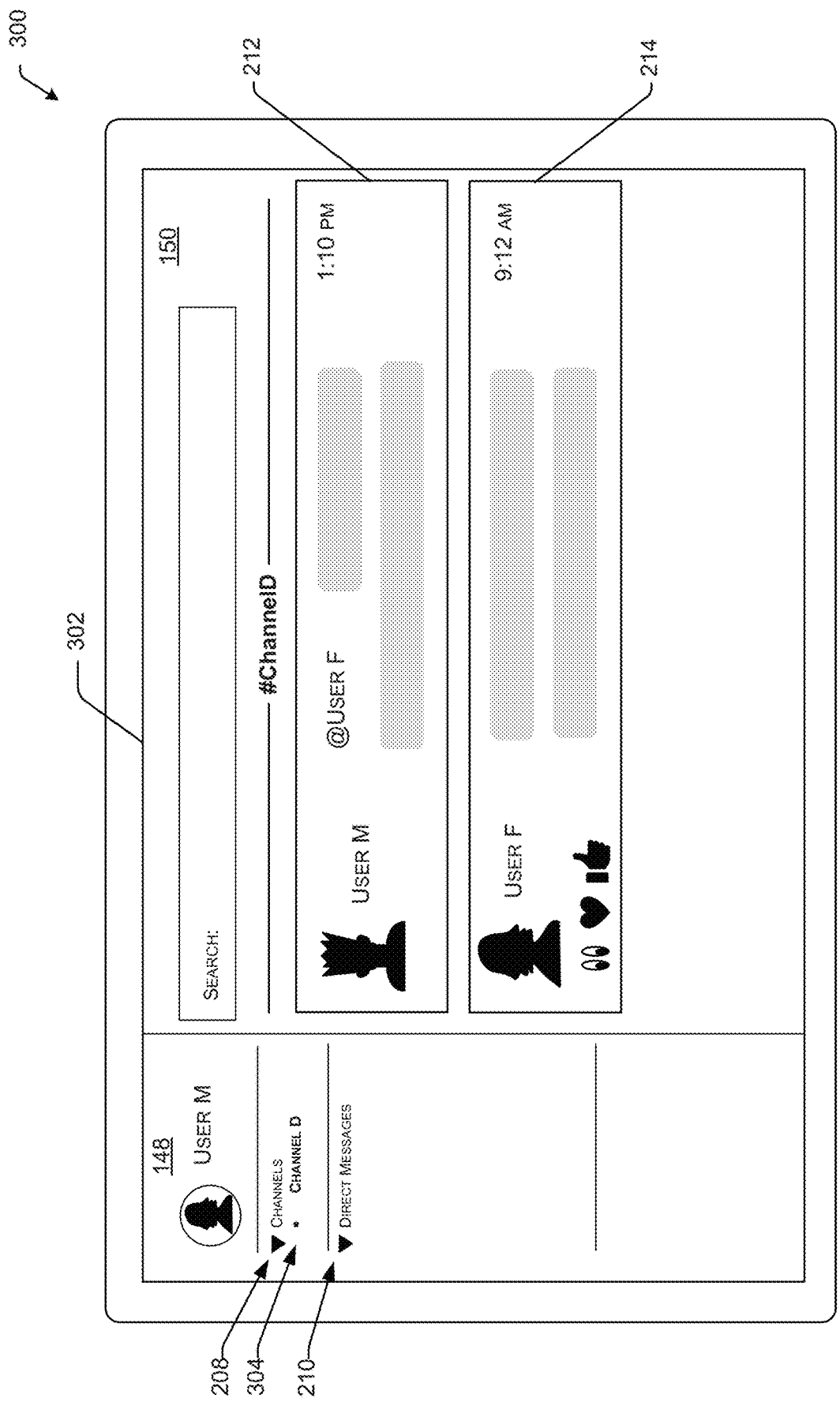
FIG. 3 depicts an example user interface associated with a guest profile according to some examples of the present disclosure.

FIG. 3 illustrates an example user computing device 300, such as user computing device 104, presenting an example user interface 302 of a communication platform corresponding to a guest profile that includes limited access privileges, as described above with reference to FIG. 1.

In various examples, the communication platform may generate the user interface 302 in response to receiving, from an administrator of an organization, a request to generate a guest profile associated with a particular communication channel and/or workspace. In some examples, the administrator may submit the request via a guest profile invitation user interface, such as guest invitation user interface 500 of FIG. 5A and/or guest invitation user interface 550 of FIG. 5B. In various examples, the administrator can designate permissions to be associated with the guest profile and/or the user interface 302. In such examples, the communication platform can generate the user interface 302 based on the permissions.

In the illustrative example, the user ("User M") may be associated with a guest profile in which the User may interact with data associated with a single communication channel 304 ("Channel D"). Though this is not intended to be so limiting, and the guest profile may be associated with one or more channels, one or more workspaces, one or more direct messaging instances, or the like. The communication channel 304 can be a non-shared communication channel to which the guest profile has limited access privileges.

In various examples, the user interface 302 may include a second region 148 with a second sub-section 208, or sub-pane, that includes indicators representing one or more communication channels to which the user has access and/or permissions to view. In some examples, the second sub-section 208 may include one or more communication channels associated with a workspace to which the user is associated, at least in part. For example, the guest profile associated with user interface 302 may have associated therewith permissions to interact with data corresponding to the communication channel 304 ("Channel D"). In some examples, the second sub-section 208 may include an indicator providing a visual indication that the user has permission to interact with content associated with at least one communication channel of the one or more communication channels.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between two or more users.

In at least one example, the user interface 302 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different communication channels and/or workspaces, based on permissions associated with the guest profile of the user. For example, the guest profile associated with user interface 302 may include indicators 212 and 214 representative of messages transmitted via the communication channel 304, but may not include indicator 216 associated with another communication channel 304 (e.g., "Channel K" illustrated in FIG. 2) to which the guest profile does not have permissions to access.

Exemplary System Operations

Various examples of the present disclosure generally relate to a method, apparatus, and system for performing dynamic channel conversion in a group-based communication system, such as that described above with respect to FIG. 1. As stated above, the dynamic channel conversion may include one or more computer-implemented processes that are configured to automatically convert and/or automatically recommend conversion of a non-shared communication channel to a shared communication channel, where the automatic conversion and/or automatic conversion recommendation can be performed based on user activity data associated with the non-shared communication channel (e.g., communication channel). As discussed above, a shared communication channel may include one or more users that are associated with a first organization (e.g., organization A) and one or more users that are associated with a second organization (e.g., organization B). In some examples, if a group (e.g., organizational) identifier is associated with a group-based communication channel before and after a conversion of the communication channel to a shared communication channel, the organization entity can be determined to be a primary organizational entity in relation to the shared communication channel and is thus assigned a primary organizational identifier. If an organization is not associated with the communication channel prior to the conversion, the organization entity can be determined to be a secondary organizational entity and is thus assigned a secondary organizational identifier.

In some examples, dynamic channel conversion may include modifying one or more channel metadata associated with a communication channel to indicate that the communication channel is a shared group-based communication channel and/or to enable at least some of the formerly-designated guest user profiles associated with the communication channel to obtain member-level functionalities. A member-level functionality describes a functionality that can be performed by a member profile associated with a communication channel but cannot be performed by a guest profile associated with the communication channel. Examples of member-level functionalities include inviting new member profiles to a corresponding communication channel (i.e., invitation-related functionalities) and sharing content data associated with the communication channel outside of the communication channel (i.e., sharing-related functionalities). In some examples, dynamic channel conversion may be performed based on input from one or more administrator user profiles. While the techniques described herein are described with regard to a communication platform, a person of ordinary skill in the relevant technology may recognize that various techniques described herein may be used to perform dynamic channel conversion in various other software applications, such as various distributed communication software applications.

Figure 4:
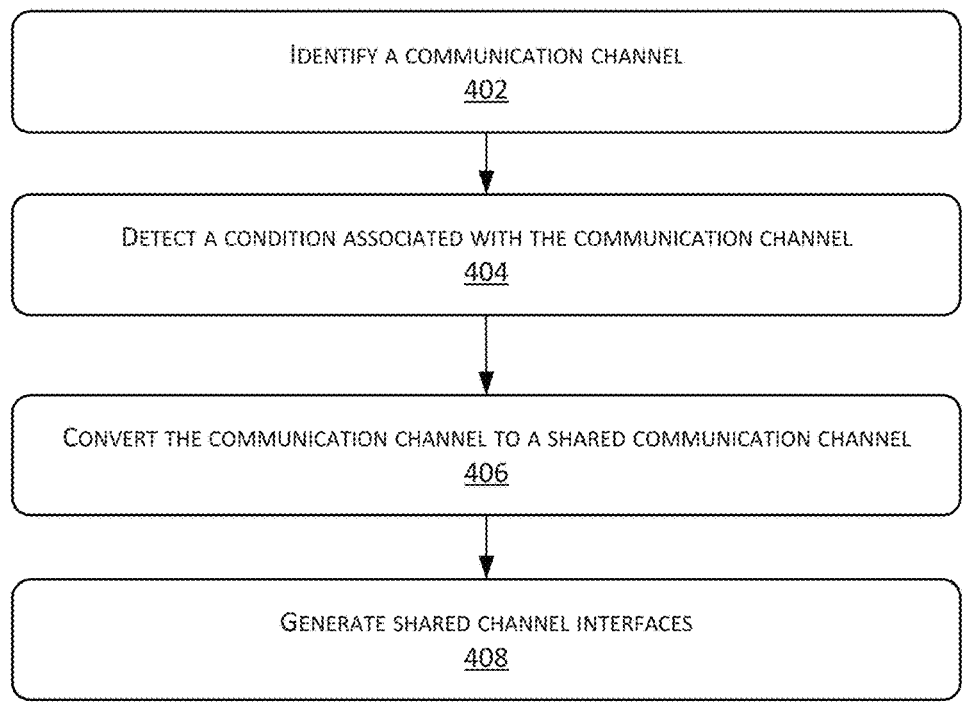
FIG. 4 is a flowchart diagram of an example process for performing dynamic channel conversion in a group-based communication system according to some examples of the present disclosure.

FIG. 4 is a flowchart diagram of an example process 400 for performing dynamic channel conversion in a communication platform. Via the various operations of the process 400, the communication platform may improve storage efficiency by automatically reconciling guest profiles and member profiles stored across diverse storage platforms based on communication channel conversions, thus increasing storage efficiency and data retrieval efficiency of the communication platform.

The process 400 begins at operation 402 when the communication platform identifies a non-shared communication channel to convert to a shared communication channel. with the non-shared communication channel (e.g., communication channel) may have associated therewith one or more member profiles associated with an organizational identifier and one or more guest profiles associated with a one or more guest profile identifiers (e.g., unique identifier associated with a particular guest profile). The non-shared communication channel may include a communication channel that is accessible to members of a single organization and/or one or more guests thereof. As such, two or more members of the single organization and/or guest(s) may communicate with one another via the non-shared group-based communication channel, but may not communicate with members of a different organization that are not associated with a guest profile via the non-shared group-based communication channel.

A guest profile may include a user profile that is associated with a communication channel but is not associated with an organizational identifier associated with the communication channel. In some examples, a guest profile has limited access privileges with respect to a communication channel, where limited access privileges may include limited privileges to the group-based communication channel such that a corresponding user profile may be denied at least one non-administrative access privilege with respect to the corresponding communication channel. For example, a user profile having a limited access privilege may be a guest user profile that is denied the privilege to request access to any content of a corresponding communication platform other than the communication channel currently associated to the guest user profile at a particular time. For another example, a user profile having a limited access privilege may be a guest user profile that is denied the privilege to add new members to the communication channel associated with the guest user profile.

Alternatively, a member profile may include a user profile that is associated with a communication channel and is also associated with an organizational identifier having an organizational association with the group-based communication channel (e.g., primary organizational identifier). In some examples, a member profile may have full access privileges (e.g., member-level access privileges) with respect to a communication channel, where full access privileges may include access to available non-administrative access privileges with respect to a corresponding communication channel. For example, a user profile having full access privilege may be a member user profile having the privilege to request access to any content of a corresponding communication platform other than the communication channel currently associated with the guest user profile at a particular time. For another example, a user profile having full access privilege may be a member user profile having privilege to add new members to the communication channel.

Figure 5A:

In some examples, a guest user profile is created based on one or more actions by an administrator user profile of a communication channel. In some examples, to create a guest user profile, an administrator user profile utilizes a guest profile invitation user interface, such as the guest invitation user interface 500 of FIG. 5A and the guest invitation user interface 550 of FIG. 5B. As depicted in FIGS. 5A-5B, the guest invitation user interface 500 and the guest invitation user interface 550 enable an administrator user profile of a corresponding communication channel to create one or more guest user profiles and define guest access criteria (e.g., guest access duration, guest access channel associations, etc.) for each group of one or more defined guest user profiles.

Figure 6:
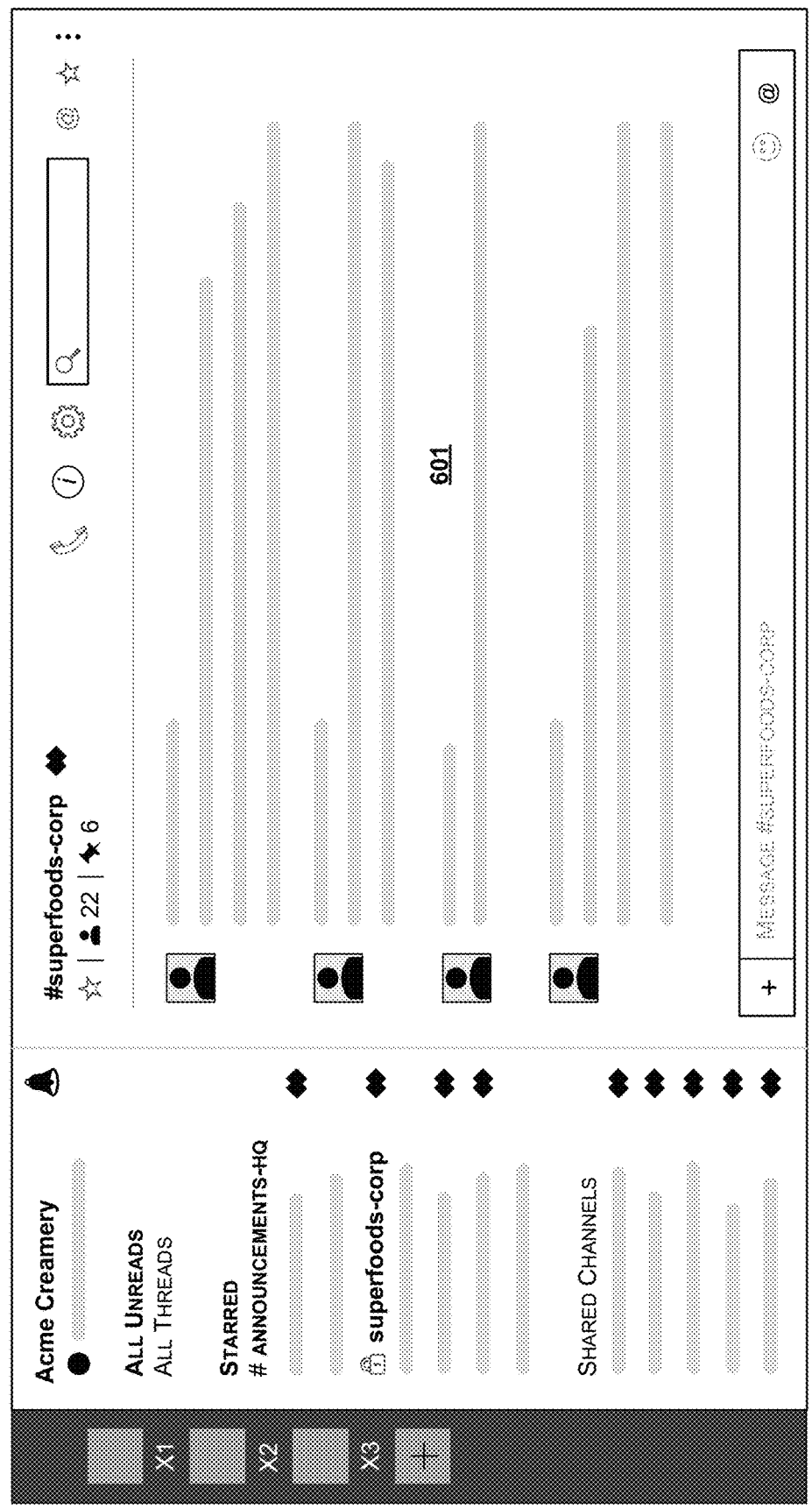
FIG. 6 is an operational example of a group-based communication channel interface according to some examples of the present disclosure.
Figure 7:
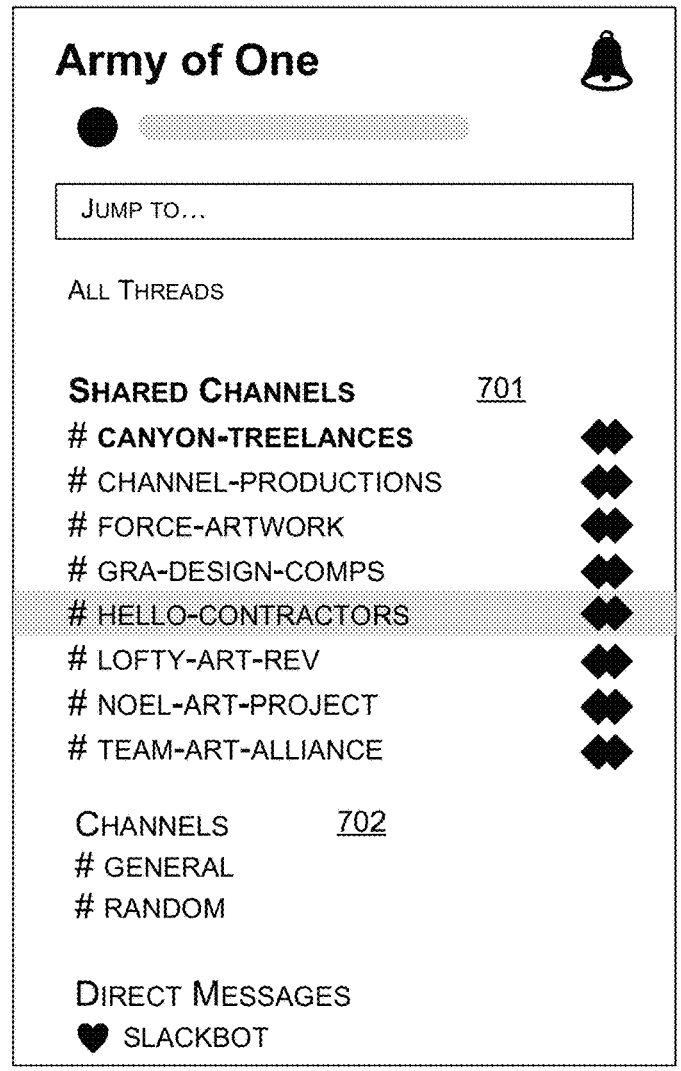
FIG. 7 is an operational example of a guest profile sidebar user interface according to some examples of the present disclosure.

Once granted guest-level permissions, a guest user profile may be introduced to other user profiles who are associated with communication channels in which the guest user profile has guest-level access privileges as a guest user profile, e.g., using a relationship initiation user interface element, such as the relationship initiation user interface element 601 in the exemplary communication channel interface 600 of FIG. 6. In general, a guest user profile may be granted access to a predefined list of one or more communication channels within the communication platform (e.g., the one or more shared channels indicated by the shared channel list user interface element 701 of the guest profile sidebar user interface 700 of FIG. 7) and may be denied the right to request access to any communication channels outside the noted predefined list of communication channels (e.g., non-shared communication channels indicated by the non-shared channel list user interface element 702).

At operation 404, the group-based communication platform detects a condition (e.g., conversion eligibility condition) for converting the communication channel. In some examples, the condition can include a condition of a communication channel that triggers conversion of the communication channel to a shared communication channel. In such examples, the communication platform can automatically convert the communication channel into a shared group-based communication channel based on the occurrence of the condition. In some examples, the condition may include a condition of a communication channel that triggers a recommendation of conversion of the communication channel to a shared group-based communication channel. In such examples, the communication platform may generate the recommendation based on the occurrence of the condition. In some examples, the condition may be determined in accordance with one or more conversion eligibility rules and/or a conversion eligibility model having one or more trained parameters. In some examples, a conversion eligibility condition may be defined based on user activities of guest profiles associated with group-based communication channels.

In some examples, detecting the condition for converting the communication channel comprises determining that an integration score for the guest organizational identifier exceeds one or more integration score eligibility thresholds. In various examples, the integration score may include a predicted degree of relationship between a corresponding communication channel and a corresponding organizational identifier. In some examples, an integration score indicates a predicted degree of relationship between a corresponding communication channel that is not shared with a corresponding organizational identifier and the corresponding organizational identifier, where the integration score between a corresponding communication channel that is not shared with a corresponding organizational identifier and the corresponding organizational identifier may be determined based on activities of guest profiles associated with the corresponding organizational profile within the corresponding communication channel. In some examples, the integration score between a corresponding group-based communication channel and a corresponding organizational identifier is determined based on one or more integration score calculation rules and/or based on an integration score calculation model, e.g., a trained integration score calculation model.

In various examples, an integration score eligibility threshold may include a data object that describes a threshold for an integration score between a corresponding group-based communication channel and a corresponding organizational identifier, where satisfaction of the integration score eligibility threshold leads to detection of the condition. In some examples, the integration score eligibility threshold is determined based on predefined configuration data associated with a dynamic channel conversion engine associated with the communication platform. In some examples, the integration score eligibility threshold is determined based on a distribution of integration scores across profile-channel pairings. In some examples, the integration score eligibility threshold is determined based on an integration score eligibility threshold determination model, e.g., a trained integration score eligibility threshold determination model. In some examples, based on a determination that the integration score is above the threshold integration score, the communication platform may automatically modify or recommend that an authorized member modify a guest account into a member account.

In some examples, the integration score for the guest organizational identifier is determined based on a count of the number of guest profiles associated with the communication channel. In some examples, the integration score for the guest organizational identifier is determined based on a guest profile activity intensity measure associated with the one or more guest user accounts. The guest profile activity intensity measure may describe an aggregate level of activity of a group of user profiles (e.g., a group of user profiles associated with an organizational identifier that is not associated with a communication channel) within a communication channel. The guest profile activity intensity measure may be determined based on a measure of statistical distribution of likes supplied by a corresponding group of user profiles within a corresponding communication channel, comments supplied by a corresponding group of user profiles within a corresponding communication channel, posts supplied by a corresponding group of user profiles within a corresponding communication channel, private messages supplied by a corresponding group of user profiles within a corresponding group-based communication channel, etc. In some examples, a guest profile activity intensity measure may be determined based on a temporal model that favors more recent user activities relative to less recent user activities.

In some examples, the integration score for the guest organizational identifier is determined based on a guest profile membership longevity measure associated with the one or more guest user accounts. The guest profile membership longevity measure may describe an aggregate level of length of membership and/or length of active membership of a group of user profiles (e.g., a group of user profiles associated with an organizational identifier that is not associated with a communication channel) within a communication channel. The guest profile activity intensity measure may be determined based on a measure of statistical distribution of lengths of membership within a corresponding communication channel and/or lengths of active membership within a corresponding communication channel across a group of user profiles. In some examples, a guest profile membership longevity measure may be determined based on an exponential temporal model that rewards greater lengths of membership within a corresponding communication channel and/or greater lengths of active membership within a corresponding communication channel in a non-linear model (e.g., such that the reward delta between a three-year-old profile and a two-year-old profile is more than the reward delta between a two-year-old profile and a one-year-old profile). In some examples, as part of converting content associated with a source account to content associated with a destination account, the messages originating from the source account may be displayed to other user accounts as messages from the destination account. This may entail changing identifying information (e.g., username, etc.) associated with the noted source user accounts.

In some examples, the communication platform detects the condition in response to determining that a measure of user activities of the guest profiles associated with the secondary organizational identifier exceeds a threshold level of guest user activity such that the measure of user activities warrants conversion of the communication channel into a shared communication channel. In some examples, the threshold level of user activities is determined based on a cost model describing costs associated with storage of data if the communication channel is converted to a shared communication channel relative to costs associated with storage of data if the communication channel is not converted to a shared communication channel. In some examples, the threshold level of user activities is determined based on a cost model associated with a retrieval speed of data if the communication channel is converted to a shared communication channel relative to a retrieval speed of data if the communication channel is not converted to a shared communication channel. In some examples, when the number of guest accounts associated with a channel exceeds a threshold number, the communication channel is converted to a shared channel. In some examples, the communication platform converts or recommends a conversion of the guest profile to a member profile based on a conversion of a communication channel from a internal channel that is associated with a single organization to a shared channel associated with two or more organizations.

At operation 406, in response to detecting the condition, the communication platform converts the communication channel to a shared communication channel. In some examples, converting the communication channel to a shared communication channel includes modifying one or more channel metadata associated with a communication channel to indicate that the communication channel is a shared communication channel and/or to enable formerly-designated guest user profiles associated with the communication channel to obtain member-level functionalities. In some examples, converting the communication channel to a shared communication channel includes performing one or more profile reconciliation actions for formerly-designated guest user profiles associated with the communication channel that may have member-level access as a result of the dynamic channel conversion. The term "profile reconciliation" refers to one or more computer-implemented processes configured to integrate data associated with two or more user profiles (e.g., a guest profile and a destination profile), where the two or more user profiles are determined to be associated with the same user entity. In some examples, converting the communication channel to a shared communication channel is performed based on input from one or more administrator user profiles, e.g., such as consent of at least one administrator user profile associated with the communication channel.

Figure 8:
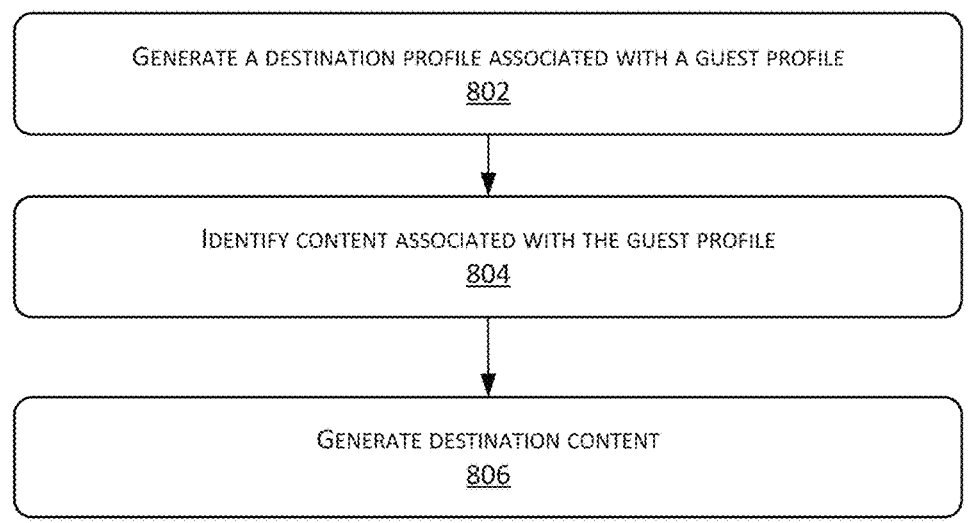
FIG. 8 is a flowchart diagram of an example process for converting a guest profile into a destination profile according to some examples of the present disclosure.

In some examples, converting the communication channel to the shared communication channel comprises generating a destination profile for each guest profile. In some examples, generating a destination profile for a particular guest profile can be performed in accordance with the process 800 depicted in FIG. 8. In various examples, the communication platform can generate the destination profile and/or reconcile data between the guest profile and the destination profile utilizing techniques described in U.S. patent application Ser. No. 17/156,916, filed Jan. 25, 2021 and entitled "Dynamic Profile Reconciliation in Group-Based Communication Systems," the entire contents of which are incorporated herein by reference. As depicted in FIG. 8, the process 800 begins at operation 802 when the communication platform generates a destination profile for the particular guest profile. In some examples, to generate the destination profile for the particular guest profile, the communication platform creates a non-guest profile for the particular guest profile. In some examples, to generate the destination profile for the particular guest profile, the communication platform can identify an existing destination profile associated with a secondary organizational identifier and assigns the identified existing destination profile as the destination profile for the guest profile. In some examples, the secondary organizational identifier can be associated with a secondary communication platform.

In some examples, to identify an existing destination profile for a guest profile, the communication platform identifies an identity association between the guest profile and the existing destination profile. In some examples, to identify the identity association between the guest profile and the existing destination profile, the communication platform determines that a determined likelihood that the guest profile and the existing destination profile are associated with the same user exceeds an identity association threshold. In some examples, to compute the determined likelihood that the guest profile and the existing destination profile are associated with the same user entity, the communication platform utilizes one or more identity association modeling rules for determining the likelihood that two or more user profiles (e.g., the guest profile and the existing destination profile) are associated with the same user entity.

At operation 804, the communication platform identifies content associated with the guest profile in the communication channel. In some examples, content includes content associated with the communication channel that is accessible by the guest profile. In some examples, the content for the guest profile includes a guest visual account identifier for the guest profile. The guest visual account identifier may include a visual descriptor of a guest account within a communication channel that indicates that the guest account has guest access privileges with respect to the communication channel. For example, a guest visual account identifier may be a logo of a guest account that indicates that the guest account has guest access privileges with respect to a corresponding communication channel. In some examples, the content for the guest profile includes a member visual account identifier. The member visual account identifier includes a visual descriptor of a member account within a communication channel that indicates that the guest account has member-level access privileges. For example, a member visual account identifier may be a logo of a member account that indicates that the member account has member-level access privileges with respect to a corresponding communication channel.

In some examples, the content for a guest profile comprises one or more referential data objects (e.g., data objects) for the guest profile. A referential data object may include a data object that describes that a corresponding data object (e.g., corresponding message data object) includes a reference to a corresponding user profile and/or to a message object associated with (e.g., authored by) the corresponding user profile. For example, a particular referential data object may describe that a corresponding message data object has tagged (e.g., @ mentioned) a corresponding user profile. For another example, a particular referential data object may describe that a corresponding message data object has linked to the content (e.g., authored by) associated with a corresponding user profile. The referential data object may have associated therewith a referential data object user identifier including a data object that uniquely identifies a user profile referenced by a corresponding referential data object. For example, the referential data object user identifier may indicate a user profile that has been tagged (e.g., @ mentioned) by another data object. For another example, the referential data object user identifier may indicate a user profile whose has linked to content associated with a corresponding user profile.

In some examples, the content for a guest profile comprises one or more communication history streams for the guest profile. A communication history stream may include a data object that describes information about a set of communications between one or more participating recipient profiles. For example, a communication history stream may include information about a private message thread for private communications of a first user profile with another user profile. For another example, a communication history stream may include information about a group message thread for group communications of a first user profile with user profiles in a particular user profile group. For yet another example, a communication history stream may include information about a group of messages associated with a group-based communication channel, where the group-based communication channel is associated with a user profile.

In some examples, the content for a guest profile comprises one or more personal data objects for the guest profile. The personal data object may include data associated with a user profile that is not shared with any other user profile of the communication platform. As a non-limiting example, the personal data object may include bookmark data objects, reminder data objects, note data objects, saved-link data objects, channel settings, direct messages, or the like. In various examples, the personal data object may have associated therewith a personal data object user identifier. The personal data object user identifier may include a data object that uniquely identifies a user profile associated with a corresponding personal data object. For example, a personal data object user identifier associated with a bookmark data object may be a data object that describes a user profile that has requested generating a bookmark associated with the bookmark data object. For another example, a personal data object user identifier for a reminder data object is a data object that describes a user profile that has requested generating a reminder associated with the reminder data object. For yet another example, a personal data object user identifier for a note data object is a data object that describes a user profile that has requested generating a note associated with the note data object. As a further example, a personal data object user identifier for a saved-link data object is a data object that describes a user profile that has requested generating a saved link associated with the saved-link data object.

At operation 806, in response to identifying the content associated with the guest profile, the communication platform generates destination content for the destination profile in the shared communication channel based on the content associated with the guest profile. In some examples, to generate destination content for the destination profile in the shared communication channel, the communication platform performs one or more profile reconciliation operations for the guest profile and the destination profile. As a non-limiting example, profile reconciliation routines may include cross-profile communication history integration routines, cross-profile personal data integration routines, and cross-profile referential data integration routines. However, a person of ordinary skill in the relevant technology may recognize that other profile reconciliation routines (e.g., other cross-profile data integration routines for content data other than communication history streams, personal data objects, and referential data objects) may be performed as part of a profile reconciliation process.

A cross-profile personal data integration may include one or more computer-implemented processes configured to integrate sets of personal data objects associated with two or more user profiles (e.g., a guest communication history stream associated with a guest profile and a corresponding destination communication history stream associated with a destination profile). For example, a cross-profile data integration may be configured to integrate personal data objects of a guest profile into personal data objects of a destination profile. For another example, a cross-profile data integration may be configured to merge personal data objects of a guest profile with personal data objects of a destination profile in order to generate integrated personal data objects for the guest profile and the destination profile.

A cross profile communication history integration may include one or more computer-implemented processes configured to integrate two communication history streams associated with two or more user profiles (e.g., a guest communication history stream associated with a guest profile and a corresponding destination communication history stream associated with a destination profile). For example, a cross-profile communication history integration may be configured to integrate a guest communication history stream associated with a guest profile into a corresponding destination communication history stream associated with a destination profile. For another example, a cross-profile communication history integration may be configured to merge a guest communication history stream associated with a guest profile and a corresponding destination communication history stream associated with a destination profile in order to generate an integrated communication history stream for the source profile and the destination profile.

In some examples, the cross-profile referential data integration may include one or more computer-implemented processes configured to integrate sets of referential data objects associated with two or more user profiles (e.g., a guest communication history stream associated with a guest profile and a corresponding destination communication history stream associated with a destination profile). For example, a cross-profile referential data integration may be configured to integrate referential data objects of a guest profile into referential data objects of a destination profile. For another example, a cross-profile referential data integration may be configured to merge referential data objects of a guest profile with referential data objects of a destination profile in order to generate integrated referential data objects for the source profile and the destination profile. In some examples, cross-profile referential data integration includes modifying referential data objects associated with a first user profile (e.g., referring to the first user profile) so that the referential data objects are instead associated with a second user profile (e.g., refer to a second user profile).

In some examples, in response to identifying the identity association, the communication platform modifies a source ownership indicator of content data associated with the guest profile to transfer ownership of the content data to the destination profile. The source ownership indicator may be associated with a source profile. The source profile may include a user profile whose corresponding data is integrated into another profile (i.e., a destination profile) in order to perform profile reconciliation in a communication platform. In some examples, the source profile has a limited access privilege (e.g., a guest access privilege) with respect to any communication channels that are associated with the source profile. The destination profile may include a user profile that integrates corresponding data associated with another profile (i.e., a source profile) into its own corresponding data in order to perform profile reconciliation in a communication platform. In some examples, the destination profile has a full access privilege (e.g., a member-level access privilege) with respect to any communication channels that are associated with the source profile.

In some examples, to perform cross-profile communication history integration, the communication platform identifies a guest communication history stream associated with the guest profile and a corresponding destination communication history stream associated with the destination profile and integrates one or more guest communication data objects of the guest communication history stream with one or more destination communication data objects of the corresponding destination communication history stream. In some examples, subsequent to performing the cross-profile communication history integration, the communication platform generates a destination stream communication interface that is configured to be accessible by a client device associated with the destination profile. In some examples, subsequent to performing the cross-profile communication history integration, the communication platform generates a destination stream communication interface that is configured to display the destination communication history stream.

In some examples, to perform the cross-profile personal data integration for the source profile and the destination profile, the communication platform identifies one or more personal data objects associated with the guest profile, where each personal data object of the one or more personal data objects is associated with a personal data object user identifier, and where each personal data object user identifier of a personal data object of the one or more personal data objects indicates a guest identifier associated with the guest profile. In some examples, subsequent to identifying the one or more personal data objects associated with the source profile, the group-based communication server modifies the personal data object user identifier of the personal data objects to indicate a destination identifier associated with the destination profile. In some examples, subsequent to performing the cross-profile personal data integration, the communication platform generates one or more destination personal data interfaces for the one or more personal data objects, where each destination personal data interface of the one or more destination personal data interfaces is configured to be accessible by a client device associated with the destination profile. A destination personal data interface may include a user interface configured to display data associated with one or more personal data objects. For example, a destination personal data interface may describe a user interface configured to display one or more message bookmarks each associated with a private communication message, a group communication message, a group-based communication message, etc. For another example, a destination personal data interface may describe a user interface configured to display one or more notes data objects associated with a destination profile. For yet another example, a destination personal data interface may describe a user interface configured to display one or more notes data objects associated with a destination profile destination profile.

In some examples, to perform cross-profile referential data integration, the communication platform identifies one or more referential data objects associated with the guest profile, where each referential data object of the one or more referential data objects is associated with a referential data object user identifier, and where each referential data object user identifier of a referential data object of the one or more referential data objects indicates the source identifier associated with the guest profile. In some examples, subsequent to identifying the one or more referential data objects, for each referential data object of the one or more referential data objects, the communication platform modifies the referential data object user identifier of the referential data object to indicate a destination identifier associated with the destination profile. In some examples, subsequent to performing the cross-profile referential data integration, the communication platform generates one or more destination referential data interfaces for the one or more referential data objects, where each destination referential data interface of the one or more destination referential data interfaces is configured to be accessible by a client device associated with the destination profile. A referential data interface may include a user interface configured to display data associated with one or more referential data objects. For example, a referential personal data interface may describe a user interface configured to display one or more messages in which a user has been referenced and/or tagged (e.g., using an @ mention). For another example, a destination personal data interface may describe a user interface configured to display one or more messages in which a message authored by a user has been referenced and/or tagged (e.g., using a share-with-comment functionality and/or a reply-to-message functionality).

In some of the examples in which the content associated with a guest profile of the one or more guest profiles comprises one or more communication history streams for the guest profile (i.e., where the one or more communication history streams for a guest profile are associated with the guest profile), generating the destination content for a destination profile of the one or more destination profiles that is associated with a guest profile of the one or more guest profiles comprises modifying the one or more communication history streams for the guest profile to be associated with the destination profile.

In some of the examples where the guest content for a guest profile of the one or more guest profiles comprises one or more personal data objects for the guest profile (i.e., where the one or more referential data objects for a guest profile of are associated with the guest profile), generating the destination content for a destination profile of the one or more destination profiles that is associated with a guest profile of the one or more guest profiles comprises modifying the one or more personal data objects for the guest profile to be associated with the destination profile.

In some of the examples where the guest content for a guest profile of the one or more guest profiles comprises one or more referential data objects for the guest profile (i.e., where the one or more referential data objects for a guest profile of are associated with the guest profile), generating the destination content for a destination profile of the one or more destination profiles that is associated with a guest profile of the one or more guest profiles comprises modifying the one or more referential data objects for the guest profile to be associated with the destination profile.

Figure 9:
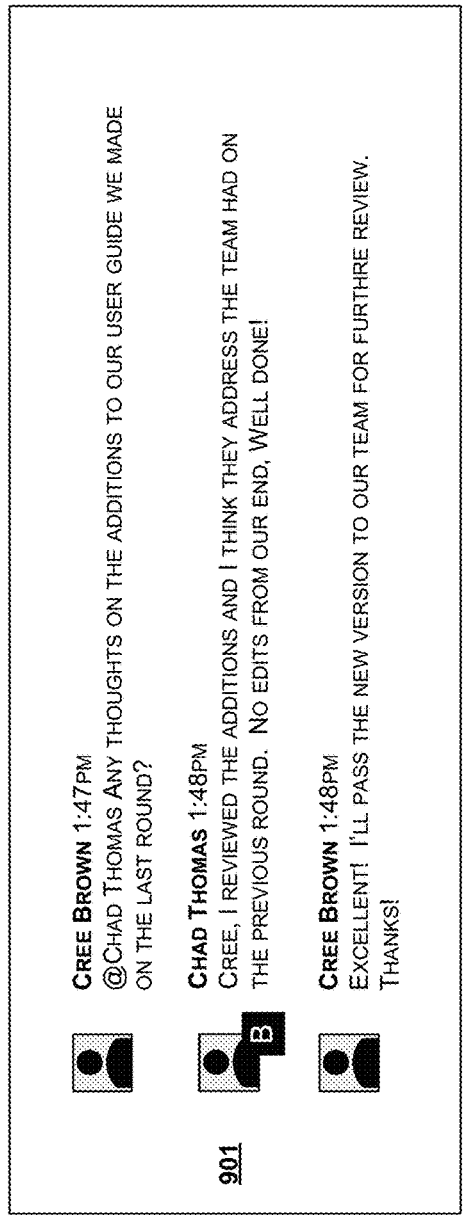
FIG. 9 is an operational example of a shared account interface according to some examples of the present disclosure.

Returning to FIG. 4, at operation 408, subsequent to converting the communication channel to the shared group-based communication channel, the communication platform generates one or more shared channel interfaces for the shared communication channel based on the destination content. A shared channel interface may be any user interface that displays at least a portion of content data associated with a shared communication channel. In some examples, the shared channel interface may display communication messages associated with a corresponding shared communication interface based on an organizational identifier of each author profile associated with a communication message of the noted group-based communication messages. In some examples, a shared channel interface may enable each member profile associated with a corresponding shared communication channel to perform one or more member-level functionalities with respect to the corresponding shared communication channel. In some examples, a shared channel interface displayed to a particular member profile having a particular organizational identifier may indicate external member profiles of a corresponding communication channel that are not associated with the particular organizational profile using a special visual indicator, e.g., the visual indicator containing a visualization including the letter B in the logo 901 of an external member profile in the shared communication interface 900 of FIG. 9.

In some examples, to convert a non-shared communication channel into a shared communication channel, the communication platform may need to replicate at least a portion of the content data associated with the non-shared communication channel to a secondary storage platform associated with the secondary organizational identifier. The secondary storage platform may include one or more storage devices associated with a secondary organizational identifier. The secondary storage platform may be configured to store communication data of any communication channels that are determined to be organizationally associated with the secondary organizational identifier. The secondary storage platform may include one or more storage units, such as multiple distributed storage units that are connected through a computer network. Each storage unit in the secondary storage platform may store at least one of one or more data assets and/or one or more data about the computed properties of one or more data assets. A transmission flow diagram of an example process 1000 for replicating data on a secondary storage platform 1002 of a secondary organizational profile during conversion of a communication channel into a shared communication channel is depicted in FIG. 10.

Figure 10:
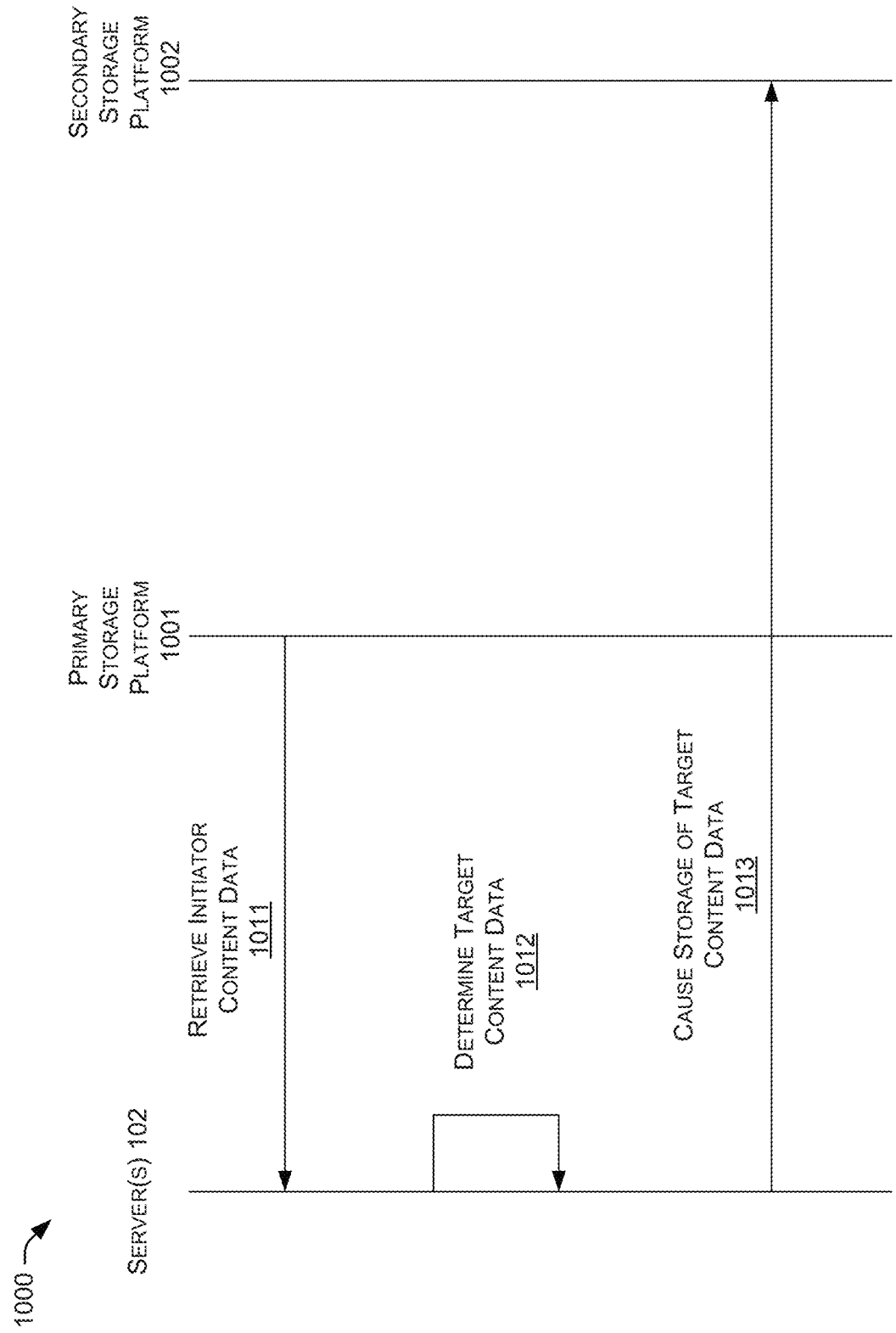
FIG. 10 is a transmission flow diagram of an example process for replicating data on a secondary storage platform according to some examples of the present disclosure.

As depicted in FIG. 10, at operation 1011 the one or more servers 102 associated with the communication platform retrieve initiator content data associated the communication channel from a primary storage platform 1001 associated with the primary organizational identifier. As described above, the primary storage platform 1001 may include a data object that describes one or more storage devices associated with a primary organizational identifier (e.g., organization associated with a communication channel before and after a conversion to a shared communication channel). The primary storage platform 1001 may be configured to store communication data of any communication channels that are determined to be organizationally associated with the primary organizational identifier. The primary storage platform 1001 may include one or more storage units, such as multiple distributed storage units that are connected through a computer network.

At operation 1012, the server(s) 102 can determine target content data based on the initiator content data. In some examples, the server(s) 102 can determine that all of one or more database shards associated with the communication channel are associated with the target content data. In some examples, the server(s) 102 can determine that a portion of one or more database shards associated with the communication channel that relate to at least one profile associated with the secondary organizational identifier are associated with the target content data.

At operation 1013, the server(s) 102 can cause the secondary storage platform 1002 associated with the secondary organizational to store the target content data. In some examples, in order to cause the secondary storage platform 1002 associated with the secondary organizational profile to store the target content data, the server(s) 102 can transmit the target content data to an application software associated with the secondary storage platform 1002 and requests the application software to store the transmitted target content data on the secondary storage platform 1002. In some examples, in order to cause the secondary storage platform 1002 associated with the secondary organizational profile to store the target content data, the server(s) 102 can transmit a link to a storage location of the target content data to an application software associated with the secondary storage platform 1002 and request the application software to download the target content data from the noted storage location and, subsequent to the downloading the target content data, store the downloaded target content data on the secondary storage platform 1002. In some examples, the storage location of each organizational identifier is managed in accordance with the storage policies (e.g., encryption policies) of the corresponding organizational identifier.

In some examples, the server(s) 102 can be configured to convert non-shared communication channels to shared communication channels. In some examples, after conversion of a non-shared communication channel to a shared communication channel which includes converting at least some of the guest profiles associated with the non-shared communication channel to member-level profiles, the organizational identifier that is associated with the converted user profiles is deemed to have ownership of content data associated with the converted user profiles. In some examples, after the described conversion, the server(s) 102 can enable the noted organizational identifier to utilize its own encryption keys to encrypt the content data associated with the converted user profiles.

In some examples, the server(s) 102 can convert user content data associated with a guest user profile to user content data associated with a member-level user profile. In some of the noted examples, as part of the conversion process, the server(s) 102 can update identifying information associated with the guest user profile to identifying information associated with the member-level user profile. For example, as depicted in FIG. 11, the user content conversion process 1100 depicted in that figure converts guest-user-profile identifying data 1101 (including the guest-level avatar and the guest marking adjacent to the username of the guest profile) associated with a guest user account of the group-based communication platform to member-level-user-profile identifying data 1102 associated with a member-level-user profile of the group-based communication platform.

Although example processing systems have been described in FIG. 1, examples of the subject matter and the functional operations described herein can be implemented in other types of digital electronic circuitry, or in computer software, firmware, or hardware, including the structures disclosed in this specification and their structural equivalents, or in combinations of one or more of them.

While this specification contains many specific example details, these should not be construed as limitations on the scope of any disclosures or of what may be claimed, but rather as description of features specific to particular examples of particular disclosures. Certain features that are described herein in the context of separate examples can also be implemented in combination in a single example. Conversely, various features that are described in the context of a single example can also be implemented in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

Thus, particular examples of the subject matter have been described. Other examples are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain examples, multitasking and parallel processing may be advantageous.

Many modifications and other examples of the disclosures set forth herein may come to mind to one skilled in the art to which these disclosures pertain having the benefit of the teachings presented in the foregoing descriptions and the associated drawings. Therefore, it is to be understood that the disclosures are not to be limited to the specific examples disclosed and that modifications and other examples are intended to be included within the scope of the appended claims. Although specific terms are employed herein, they are used in a generic and descriptive sense only and not for purposes of limitation.

Example Clauses

A: An apparatus for performing dynamic channel conversion in a communication platform, the apparatus comprising at least one processor and at least one memory including program code, the at least one memory and the program code configured to, with the processor, cause the apparatus to at least: identify a communication channel of the communication platform, wherein the communication channel is associated with one or more member profiles associated with a first organizational identifier and one or more guest profiles associated with at least a second organizational identifier that is different from the first organizational identifier; detect a condition associated with the communication channel; in response to determining that the condition is satisfied, convert the communication channel to a shared communication channel, wherein converting the communication channel to the shared communication channel comprises: identifying a guest profile of the one or more guest profiles; generating a destination profile associated with the guest profile; identifying content associated with the guest profile corresponding to the communication channel; and generating destination content associated with the destination profile based at least in part on the content; and in response to converting the communication channel to the shared communication channel, generate one or more shared channel interfaces for the shared communication channel based at least in part on the destination content.

B: The apparatus of paragraph A, wherein the shared channel is associated with the destination profile and not the guest profile.

C: The apparatus of either paragraph A or paragraph B, wherein: the content associated with the guest profile comprises one or more data objects associated with the guest profile, and generating the destination content associated with the destination profile comprises modifying the one or more data objects associated with the guest profile to be associated with the destination profile.

D: The apparatus of any one of paragraphs A-C, wherein: the content associated with the guest profile comprises one or more communication history streams, and generating the destination content associated with the destination profile comprises modifying the one or more communication history streams associated with the guest profile to be associated with the destination profile.

E: The apparatus of any one of paragraphs A-D, wherein detecting the condition associated with the communication channel comprises determining that an integration score of a guest organization satisfies an integration eligibility threshold.

F: The apparatus of any one of paragraphs A-E, wherein determining the condition is satisfied is based at least in part on a number of guest profiles associated with the communication channel.

G: The apparatus of any one of paragraphs A-F, wherein determining the condition is satisfied is based at least in part on a determination of a threshold amount of guest profile activity associated with the one or more guest profiles.

H: The apparatus of any one of paragraphs A-G, wherein determining the condition is satisfied is based at least in part on determining that a guest profile membership longevity measure associated with the one or more guest profiles exceeds a threshold longevity.

I: The apparatus of any one of paragraphs A-H, wherein converting the communication channel to the shared communication channel further comprises: enabling the destination profile associated with the guest profile access to the shared communication channel based at least in part on a member access level privilege; and removing the guest profile from a datastore associated with the communication platform. J. The apparatus of paragraph I, wherein enabling the destination profile comprises enabling one or more member-level functionalities associated with a shared channel interface of the one or more shared channel interfaces, the shared channel interface being associated with the destination profile and the member-level functionalities comprising at least one of: an invitation-related functionality; or a sharing-related functionality.

K: A computer-implemented method for performing dynamic channel conversion in a communication platform, the computer-implemented method comprising: identifying a communication channel of the communication platform, wherein the communication channel is associated with one or more member profiles associated with a first organizational identifier and one or more guest profiles associated with at least a second organizational identifier that is different from the first organizational identifier; detecting a condition associated with the communication channel; in response to determining that the condition is satisfied, converting the communication channel to a shared communication channel, wherein converting the communication channel to the shared communication channel comprises: identifying a guest profile of the one or more guest profiles; generating a destination profile associated with the guest profile; identifying content associated with the guest profile in the communication channel; and generating destination content associated with the destination profile based at least in part on the content; and based at least in part on converting the communication channel to the shared communication channel, generating one or more shared channel interfaces for the shared communication channel based at least in part on the destination content.

L: The computer-implemented method of paragraph K, wherein the shared channel is associated with the destination profile and not the guest profile.

M: The computer-implemented method of either paragraph K or paragraph L, wherein: the content associated with the guest profile comprises one or more data objects associated with the guest profile, and generating the destination content associated with the destination profile comprises modifying the one or more data objects associated with the guest profile to be associated with the destination profile.

N: The computer-implemented method of any one of paragraphs K-M, wherein: the content associated with the guest profile comprises one or more communication history streams, and generating the destination content associated with the destination profile comprises modifying the one or more communication history streams associated with the guest profile to be associated with the destination profile.

O: The computer-implemented method of any one of paragraphs K-N, wherein detecting the condition associated with the communication channel comprises determining that an integration score of a guest organization satisfies an integration eligibility threshold.

P: A system or device comprising: a processor; and a non-transitory computer-readable medium storing instructions that, when executed, cause a processor to perform a computer-implemented method as any one of paragraphs K-O describe.

Q: A system or device comprising: a means for processing; and a means for storing coupled to the means for processing, the means for storing including instructions to configure one or more devices to perform a computer-implemented method as any one of paragraphs K-O describe.

R: A non-transitory computer storage medium comprising instructions for performing dynamic channel conversion in a communication platform, the instructions being configured to cause one or more processors to at least perform operations configured to: identify a communication channel of the communication platform, wherein the communication channel is associated with one or more member profiles associated with a first organizational identifier and one or more guest profiles associated with at least a second organizational identifier that is different from the first organizational identifier; detect condition associated with the communication channel; in response to determining that the condition is satisfied, convert the communication channel to a shared communication channel, wherein converting the communication channel to the shared communication channel comprises, comprises: identifying a guest profile of the one or more guest profiles; generating a destination profile associated with the guest profile; identifying content associated with the guest profile in the communication channel; and generating destination content associated with the destination profile based at least in part on the content; and based at least in part on converting the communication channel to the shared communication channel, generate one or more shared channel interfaces for the shared communication channel based at least in part on the destination content.

S: The non-transitory computer storage medium of paragraph R, wherein the shared channel is associated with the destination profile and not the guest profile.

T: The non-transitory computer storage medium of either paragraph R or paragraph S, wherein: the content associated with the guest profile comprises one or more data objects associated with the guest profile, and generating the destination content associated with the destination profile comprises modifying the one or more data objects associated with the guest profile to be associated with the destination profile.

U: The non-transitory computer storage medium of any one of paragraphs R-T, wherein: the content associated with the guest profile comprises one or more communication history streams, and generating the destination content associated with the destination profile comprises modifying the one or more communication history streams associated with the guest profile to be associated with the destination profile.

V: The non-transitory computer storage medium of any one of paragraphs R-U, wherein detecting the condition associated with the communication channel comprises determining that an integration score of a guest organization satisfies an integration eligibility threshold.

While the example clauses described above are described with respect to one particular implementation, it should be understood that, in the context of this document, the content of the example clauses may also be implemented via a method, device, system, a computer-readable medium, and/or another implementation.

What is claimed is:

1. An apparatus for performing dynamic channel conversion in a communication platform, the apparatus comprising at least one processor and at least one memory including program code, the at least one memory and the program code configured to, with the processor, cause the apparatus to at least:

identify a communication channel of the communication platform, wherein the communication channel is associated with one or more member profiles having full access privileges to the communication channel and being associated with a first organizational identifier, and one or more guest profiles having limited access privileges to the communication channel and being associated with at least a second organizational identifier that is different from the first organizational identifier;

detect a condition associated with the communication channel;

in response to determining that the condition is satisfied, convert the communication channel to a shared communication channel, wherein converting the communication channel to the shared communication channel comprises:

identifying a first guest profile of the one or more guest profiles;

converting the first guest profile to a corresponding destination profile having the full access privileges to the communication channel;
identifying content associated with the first guest profile corresponding to the communication channel;
generating destination content associated with the corresponding destination profile based at least in part on the content; and
in response to converting the communication channel to the shared communication channel, generate one or more shared channel interfaces for the shared communication channel based at least in part on the destination content.

2. The apparatus of claim 1, wherein the shared communication channel is associated with the corresponding destination profile and not the first guest profile.

3. The apparatus of claim 1, wherein:
the content associated with the first guest profile comprises one or more data objects associated with the first guest profile, and
generating the destination content associated with the corresponding destination profile comprises modifying the one or more data objects associated with the first guest profile to be associated with the corresponding destination profile.

4. The apparatus of claim 1, wherein:
the content associated with the first guest profile comprises one or more communication history streams, and
generating the destination content associated with the corresponding destination profile comprises modifying the one or more communication history streams associated with the first guest profile to be associated with the corresponding destination profile.

5. The apparatus of claim 1, wherein detecting the condition associated with the communication channel comprises determining that an integration score of a guest organization satisfies an integration eligibility threshold.

6. The apparatus of claim 1, wherein determining the condition is satisfied is based at least in part on a quantity of guest profiles that are associated with the communication channel.

7. The apparatus of claim 1, wherein determining the condition is satisfied is based at least in part on a determination of a threshold amount of guest profile activity associated with the one or more guest profiles.

8. The apparatus of claim 1, wherein determining the condition is satisfied is based at least in part on determining that a guest profile membership longevity measure associated with the one or more guest profiles exceeds a threshold longevity.

9. The apparatus of claim 1, wherein converting the communication channel to the shared communication channel further comprises:
enabling the corresponding destination profile access to the shared communication channel based at least in part on a member access level privilege; and
removing the first guest profile from a datastore associated with the communication platform.

10. The apparatus of claim 9, wherein enabling the corresponding destination profile access to the shared communication channel comprises enabling one or more member-level functionalities associated with a first shared channel interface of the one or more shared channel interfaces, the first shared channel interface of the one or more shared channel interfaces being associated with the corresponding destination profile and the member-level functionalities comprising at least one of:
an invitation-related functionality; or
a sharing-related functionality.

11. A computer-implemented method for performing dynamic channel conversion in a communication platform, the computer-implemented method comprising:
identifying a communication channel of the communication platform, wherein the communication channel is associated with one or more member profiles having full access privileges to the communication channel and being associated with a first organizational identifier, and one or more guest profiles having limited access privileges to the communication channel and being associated with at least a second organizational identifier that is different from the first organizational identifier;
detecting a condition associated with the communication channel;
in response to determining that the condition is satisfied, converting the communication channel to a shared communication channel, wherein converting the communication channel to the shared communication channel comprises:
identifying a first guest profile of the one or more guest profiles;
converting the first guest profile to a corresponding destination profile having the full access privileges to the communication channel;
identifying content associated with the first guest profile in the communication channel;
generating destination content associated with the corresponding destination profile based at least in part on the content; and
based at least in part on converting the communication channel to the shared communication channel, generating one or more shared channel interfaces for the shared communication channel based at least in part on the destination content.

12. The computer-implemented method of claim 11, wherein the shared communication channel is associated with the corresponding destination profile and not the first guest profile.

13. The computer-implemented method of claim 11, wherein: the content associated with the first guest profile comprises one or more data objects associated with the first guest profile, and
generating the destination content associated with the corresponding destination profile comprises modifying the one or more data objects associated with the first guest profile to be associated with the corresponding destination profile.

14. The computer-implemented method of claim 11, wherein:
the content associated with the first guest profile comprises one or more communication history streams, and
generating the destination content associated with the corresponding destination profile comprises modifying the one or more communication history streams associated with the first guest profile to be associated with the corresponding destination profile.

15. The computer-implemented method of claim 11, wherein detecting the condition associated with the communication channel comprises determining that an integration score of a guest organization satisfies an integration eligibility threshold.

16. A non-transitory computer storage medium comprising instructions for performing dynamic channel conversion in a communication platform, the instructions being configured to cause one or more processors to at least perform operations configured to:
- identify a communication channel of the communication platform, wherein the communication channel is associated with one or more member profiles having full access privileges to the communication channel and being associated with a first organizational identifier and one or more guest profiles having limited access privileges to the communication channel and being associated with at least a second organizational identifier that is different from the first organizational identifier;
- detect condition associated with the communication channel;
- in response to determining that the condition is satisfied, convert the communication channel to a shared communication channel, wherein converting the communication channel to the shared communication channel comprises, comprises:
  - identifying a first guest profile of the one or more guest profiles;
  - converting the first guest profile to a corresponding destination profile having the full access privileges to the communication channel;
  - identifying content associated with the first guest profile in the communication channel;
  - generating destination content associated with the corresponding destination profile based at least in part on the content; and
- based at least in part on converting the communication channel to the shared communication channel, generate one or more shared channel interfaces for the shared communication channel based at least in part on the destination content.

17. The non-transitory computer storage medium of claim 16, wherein the shared communication channel is associated with the corresponding destination profile and not the first guest profile.

18. The non-transitory computer storage medium of claim 16, wherein:
- the content associated with the first guest profile comprises one or more data objects associated with the first guest profile, and
- generating the destination content associated with the corresponding destination profile comprises modifying the one or more data objects associated with the first guest profile to be associated with the corresponding destination profile.

19. The non-transitory computer storage medium of claim 16, wherein:
- the content associated with the first guest profile comprises one or more communication history streams, and
- generating the destination content associated with the corresponding destination profile comprises modifying the one or more communication history streams associated with the first guest profile to be associated with the corresponding destination profile.

20. The non-transitory computer storage medium of claim 16, wherein detecting the condition associated with the communication channel comprises determining that an integration score of a guest organization satisfies an integration eligibility threshold.

* * * * *